(12) United States Patent
Suzuki

(10) Patent No.: US 7,708,467 B2
(45) Date of Patent: May 4, 2010

(54) VEHICLE WHEEL BEARING APPARATUS

(75) Inventor: Syougo Suzuki, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/248,933

(22) Filed: Oct. 10, 2008

(65) Prior Publication Data
US 2009/0041401 A1    Feb. 12, 2009

Related U.S. Application Data

(63) Continuation of application No. PCT/JP2007/000392, filed on Apr. 11, 2007.

(30) Foreign Application Priority Data

| Apr. 12, 2006 | (JP) | ............................ 2006-109992 |
| Apr. 12, 2006 | (JP) | ............................ 2006-109993 |
| May 9, 2006 | (JP) | ............................ 2006-129914 |
| May 9, 2006 | (JP) | ............................ 2006-129915 |

(51) Int. Cl.
*F16C 13/00*    (2006.01)
*F16C 33/76*    (2006.01)

(52) U.S. Cl. ..................... 384/544; 384/548; 384/484; 384/499; 384/477; 384/607

(58) Field of Classification Search ................ 384/448, 384/486, 477, 544, 549, 589, 499, 548, 130, 384/607; 277/353, 551, 560, 562, 571–572
See application file for complete search history.

(56) References Cited

U.S. PATENT DOCUMENTS 6,267,509 B1 *   7/2001   Morimura ................ 384/448

FOREIGN PATENT DOCUMENTS

| JP | 03-140618 | 6/1991 |
| JP | 05-14634 | 2/1993 |
| JP | 2001165179 A * | 6/2001 |
| JP | 2003-130075 | 5/2003 |
| JP | 2003148494 A * | 5/2003 |
| JP | 2004-324687 | 11/2004 |
| JP | 2005061616 A * | 3/2005 |
| JP | 2005-140188 | 6/2005 |
| JP | 2005-147298 | 6/2005 |
| JP | 2005-233287 | 9/2005 |
| JP | 2005-291485 | 10/2005 |
| JP | 2005-337446 | 12/2005 |
| WO | WO2005/116471 | 12/2005 |
| WO | WO2006/008898 | 1/2006 |

* cited by examiner

*Primary Examiner*—Marcus Charles
(74) *Attorney, Agent, or Firm*—Harness, Dickey & Pierce, P.L.C.

(57) ABSTRACT

A vehicle wheel bearing apparatus has an outer member and an inner member. Double row rolling elements are freely rollably contained between the outer and inner raceway surfaces of the outer and inner members, via cages. Seals are mounted between the outer and the inner members. A backup seal is fit onto the outer circumference of the outer side end of the outer member. The backup seal has a metal core that includes a cylindrical fitting portion and an upstanding portion that extends radially outward from the fitting portion. A sealing member is integrally adhered to the metal core. The sealing member has a side lip formed so that it extends radially outward from the metal core and inclines toward the inner side surface of the wheel mounting flange to slidably contact the flange, via a predetermined interference.

14 Claims, 11 Drawing Sheets

[Fig 1]
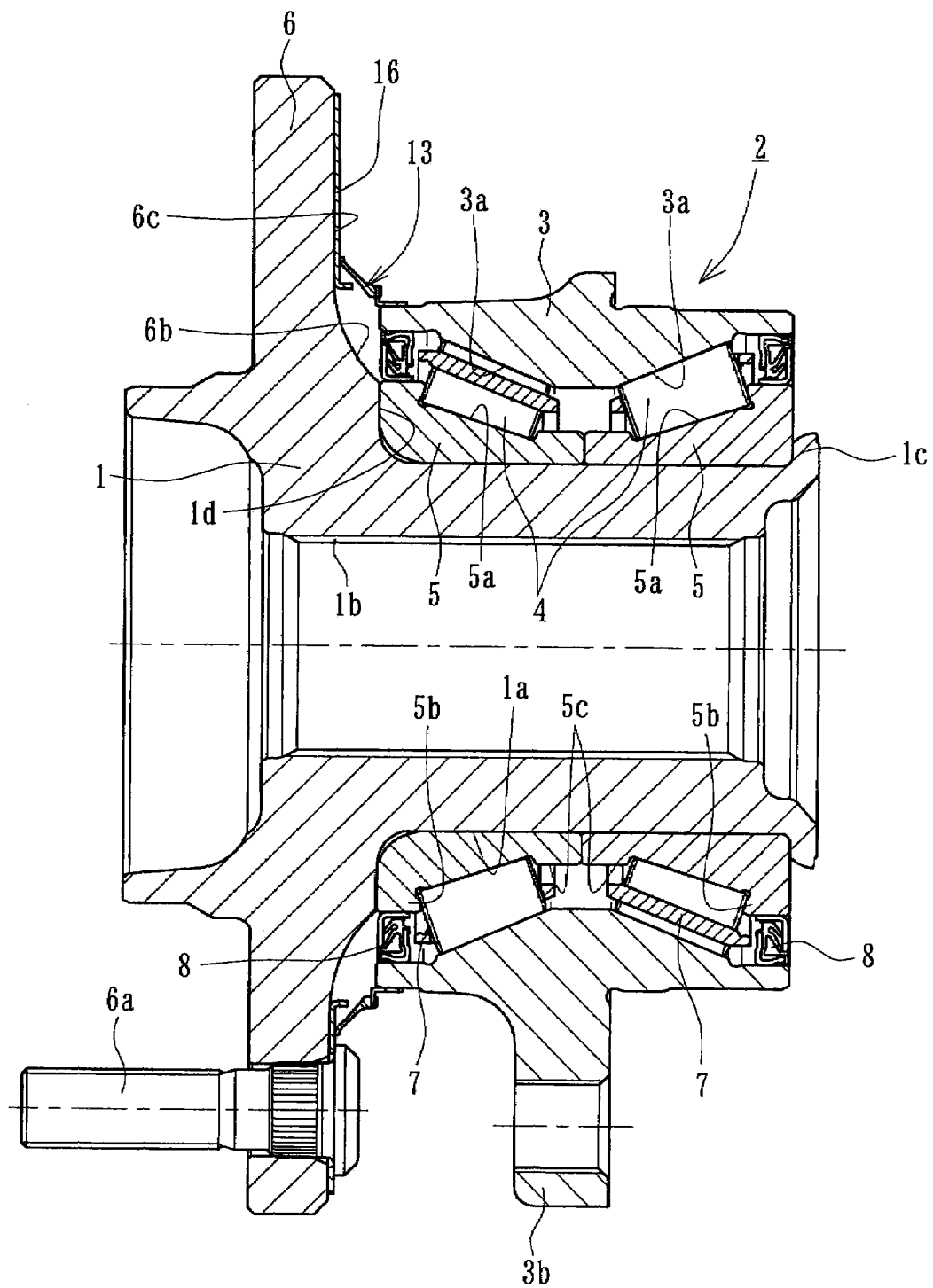

[Fig 2]
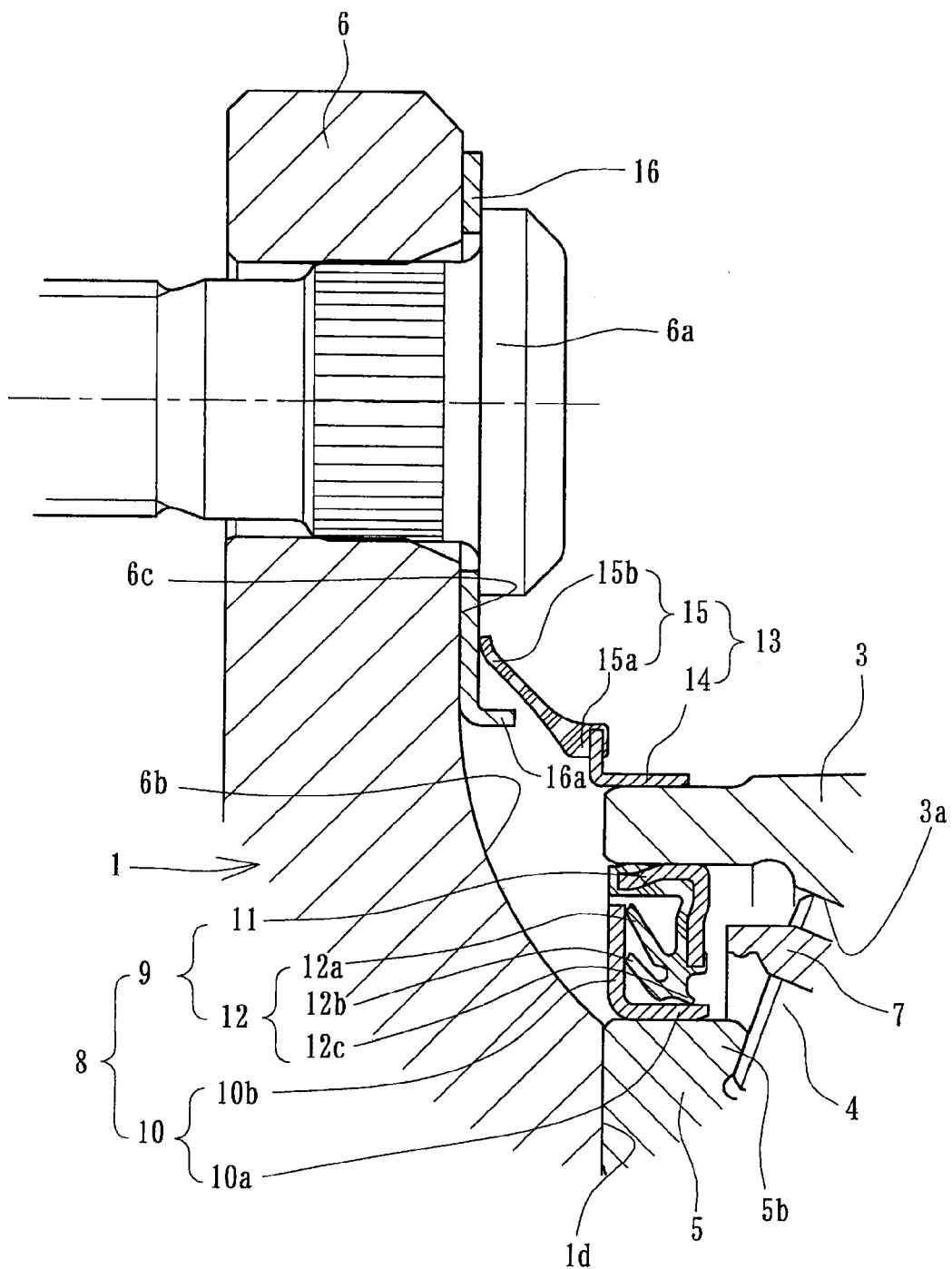

[Fig 3]
(a)
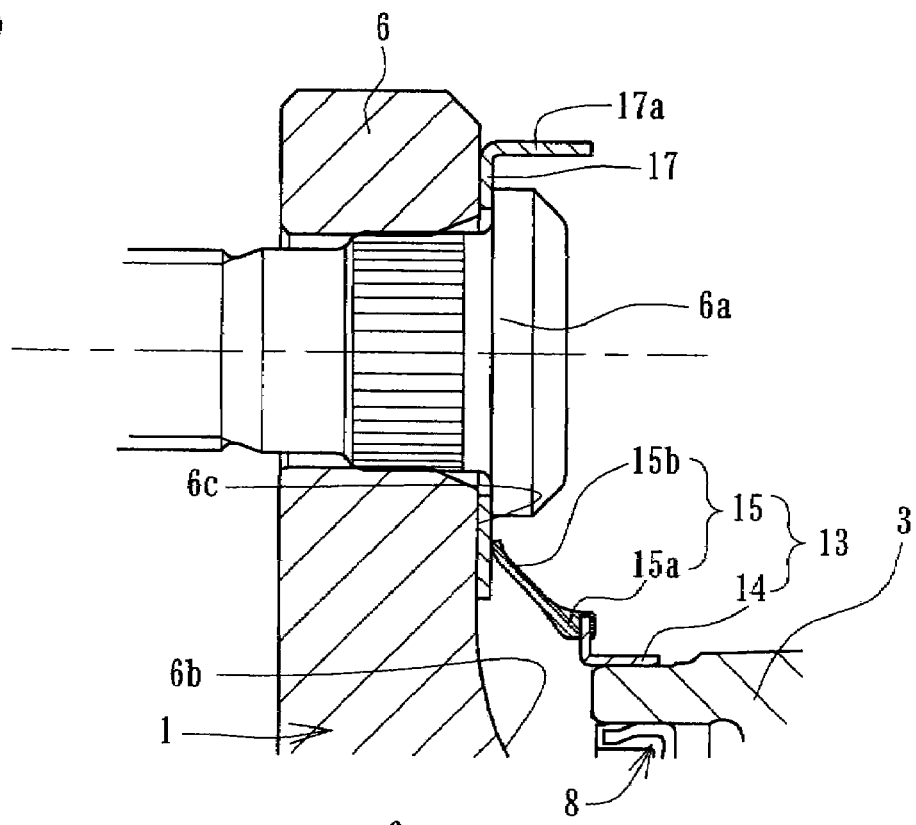
(b)
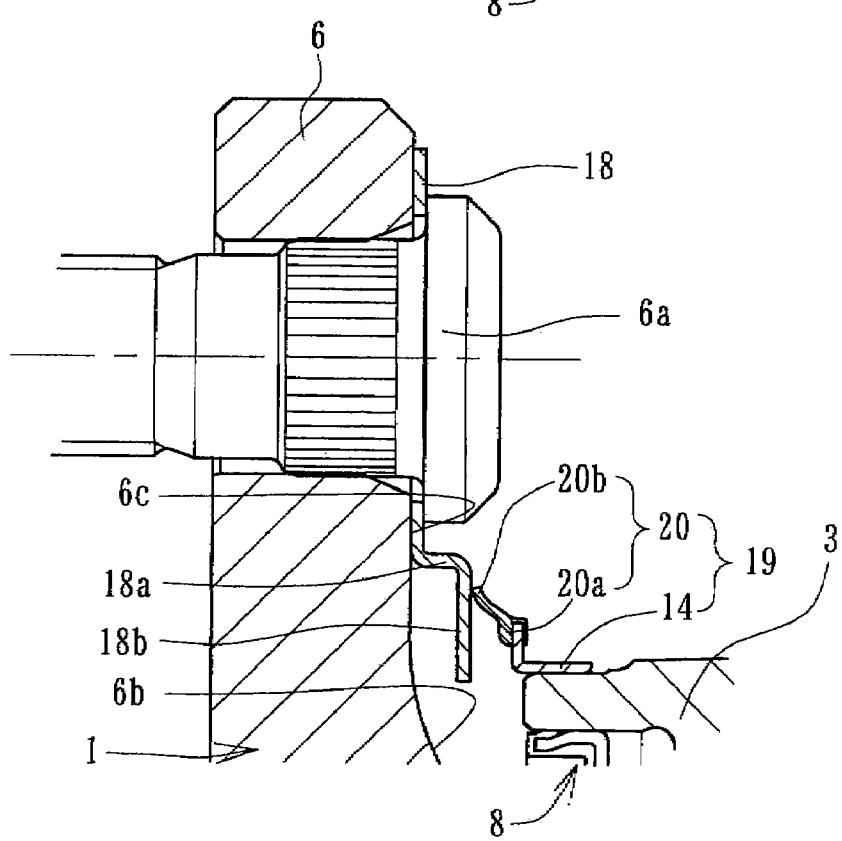

[Fig 4]
(a)
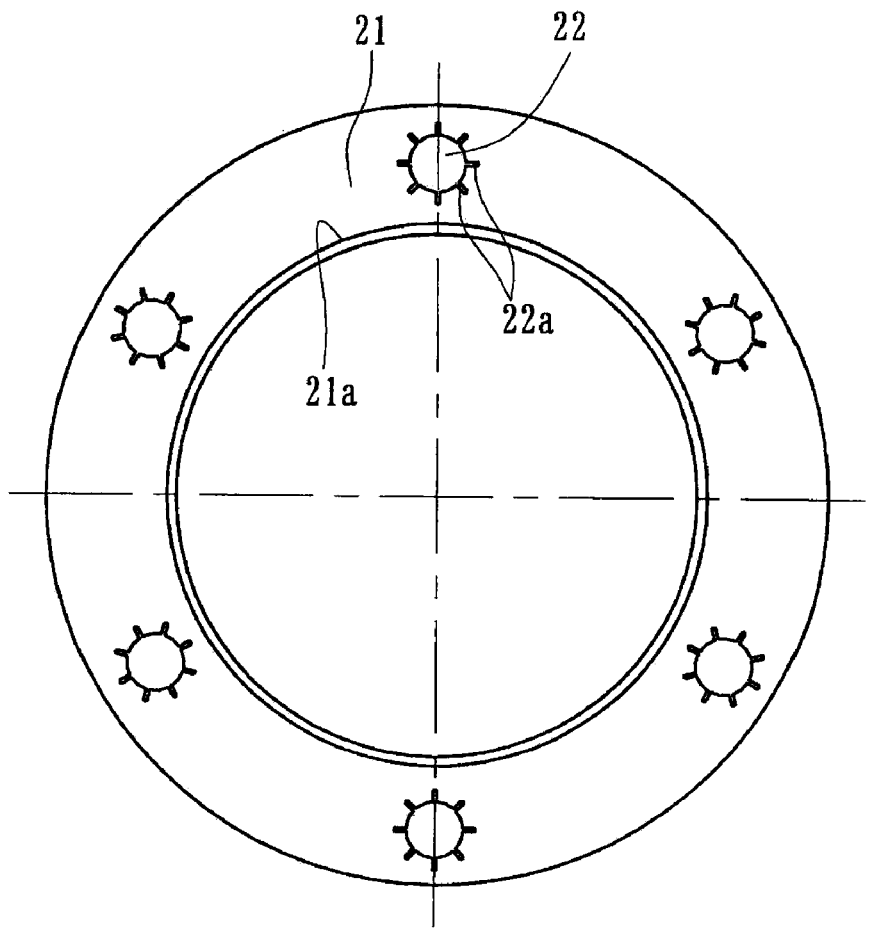
(b)
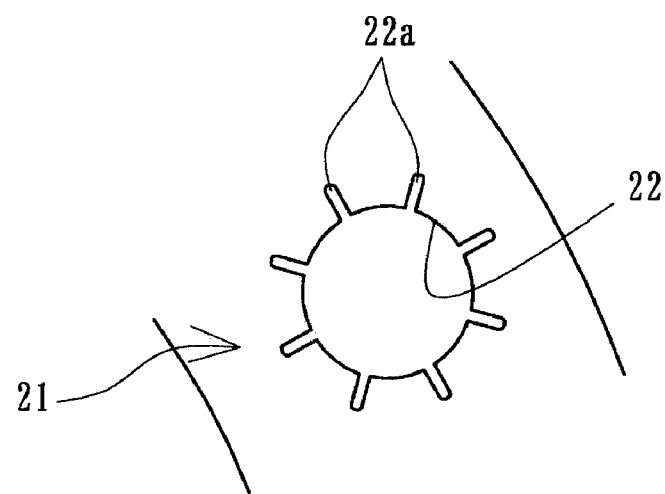

[Fig 5]
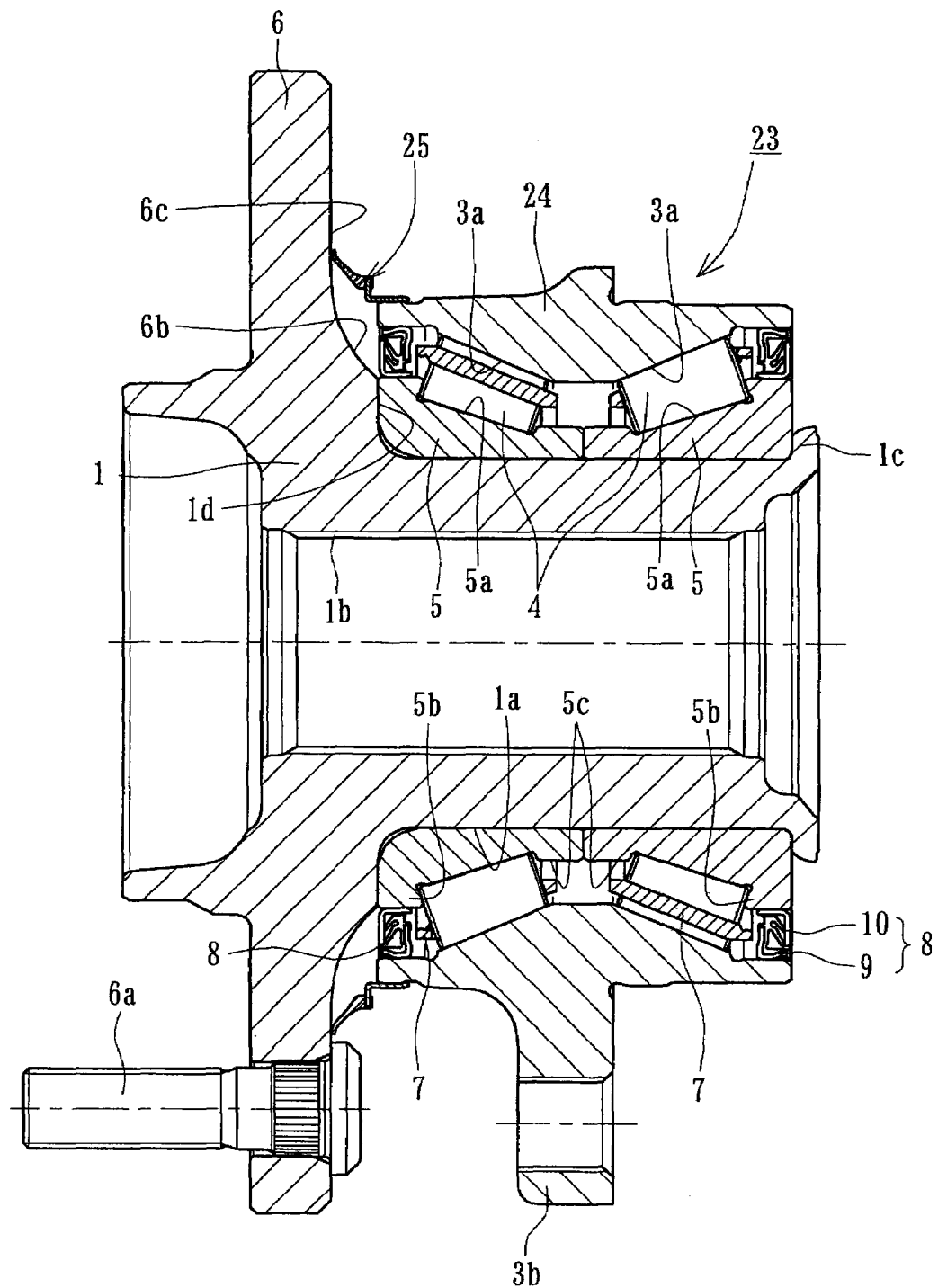

[Fig 6]
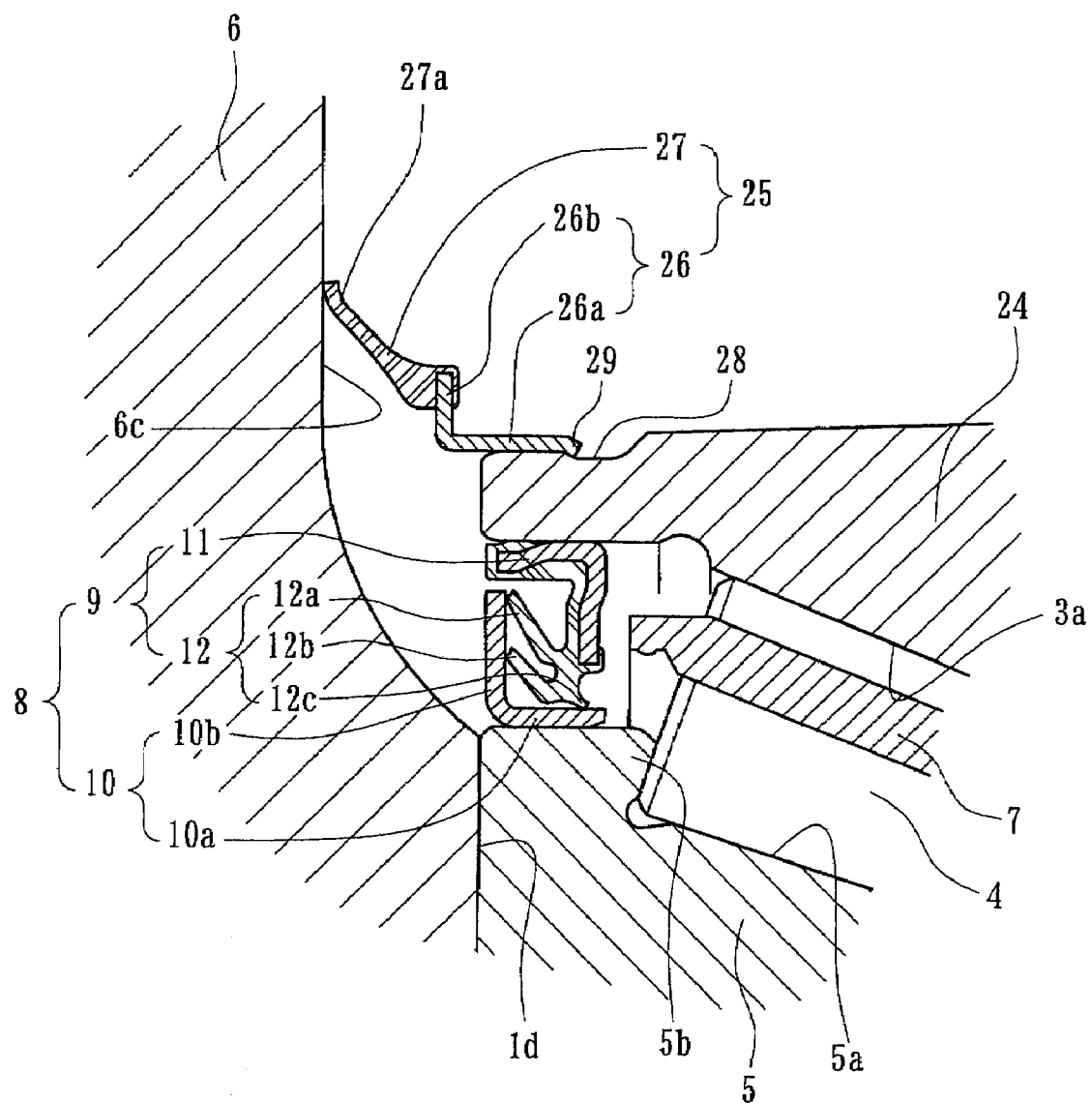

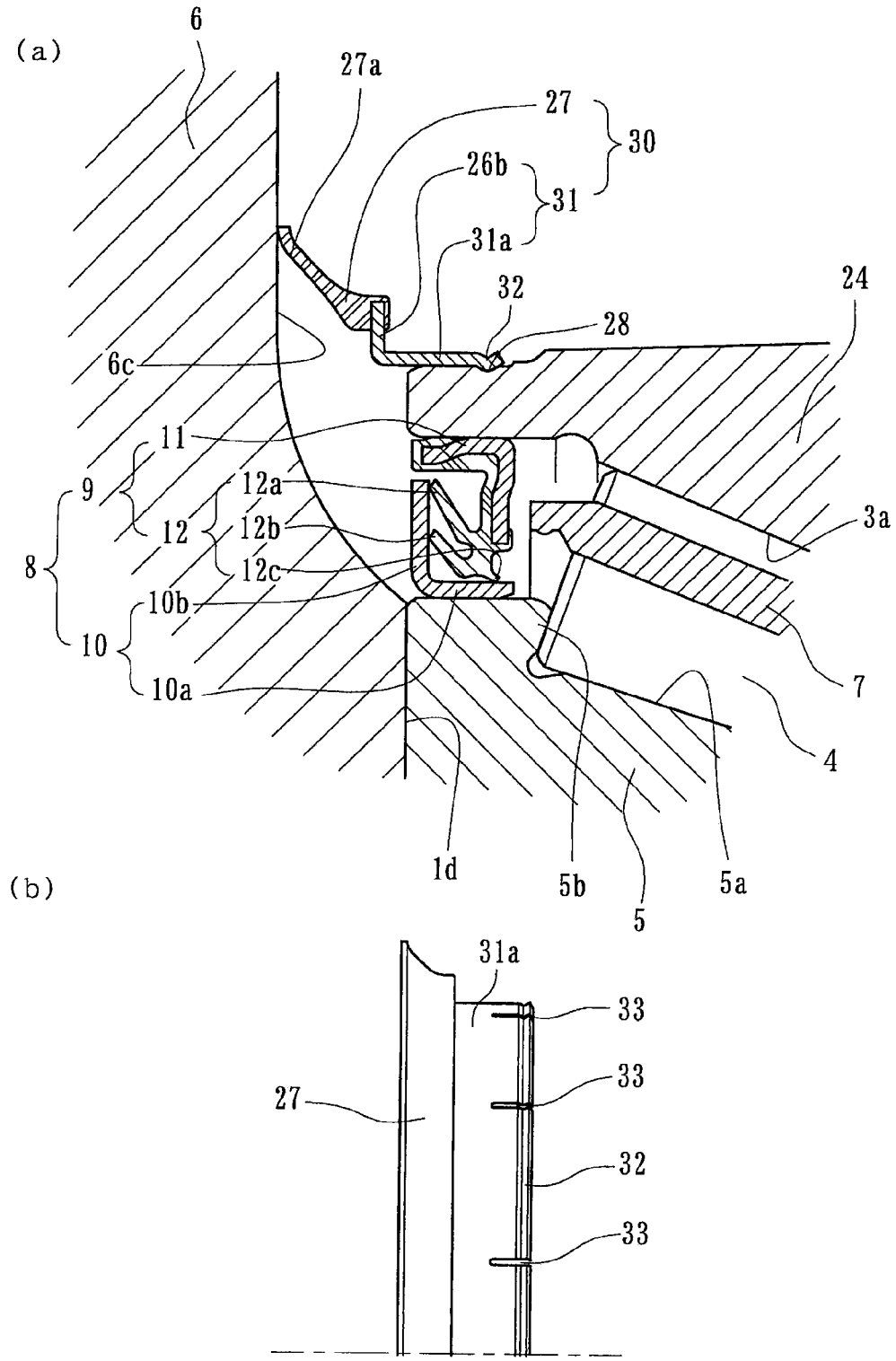

[Fig 8]
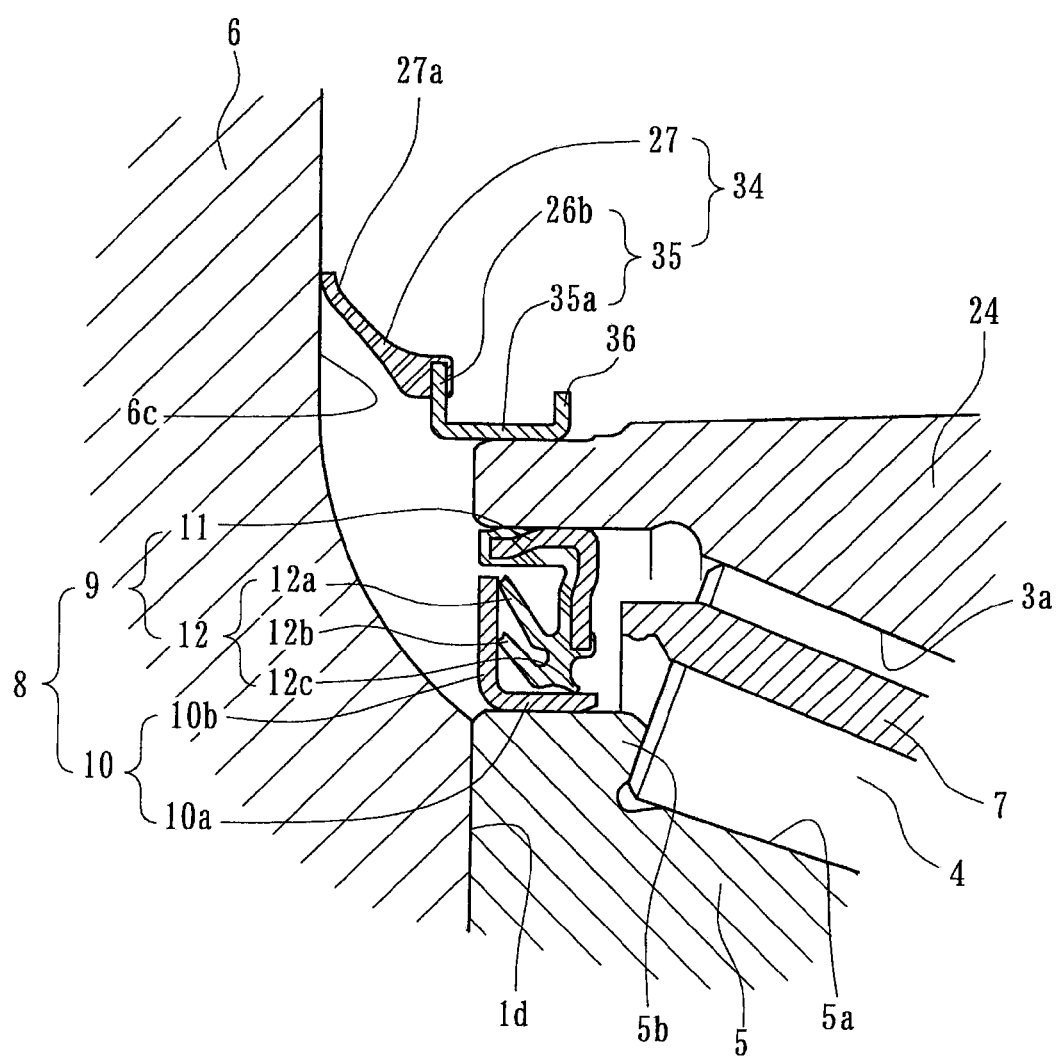

[Fig 9]
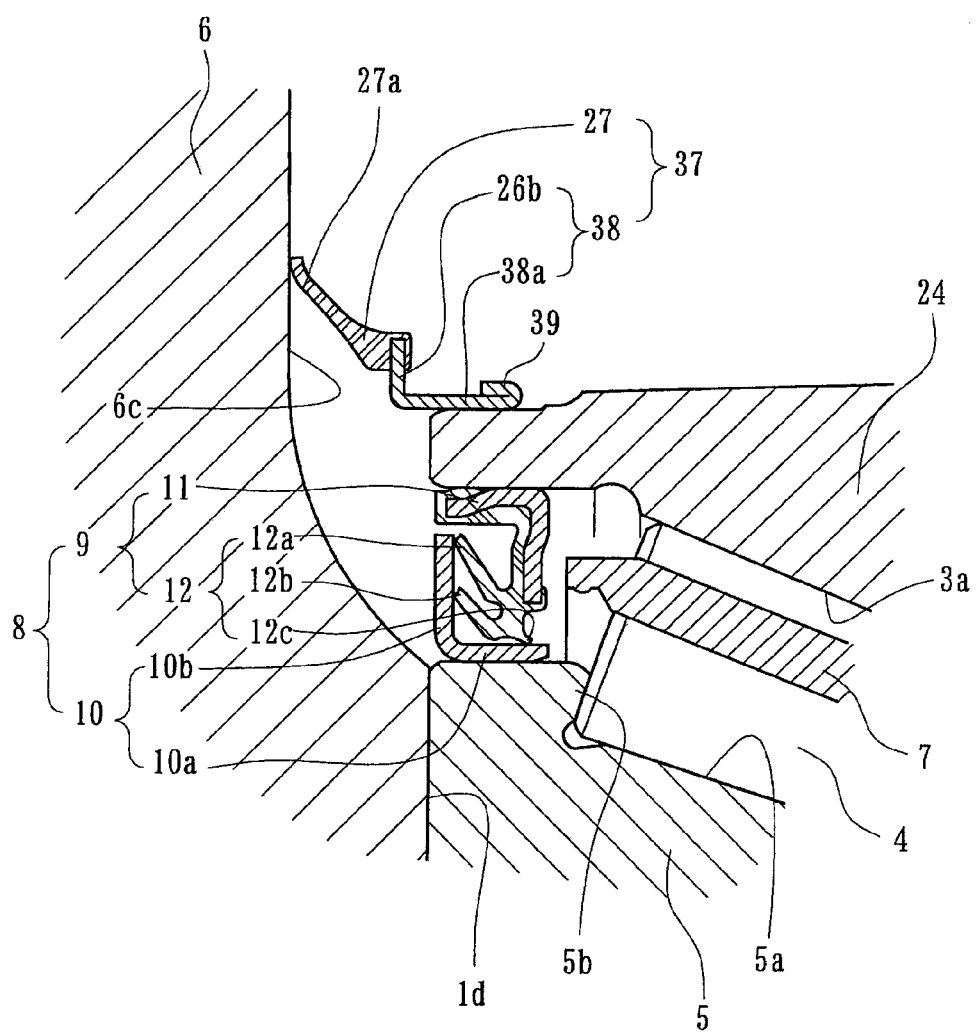

[Fig 10]
PRIOR ART
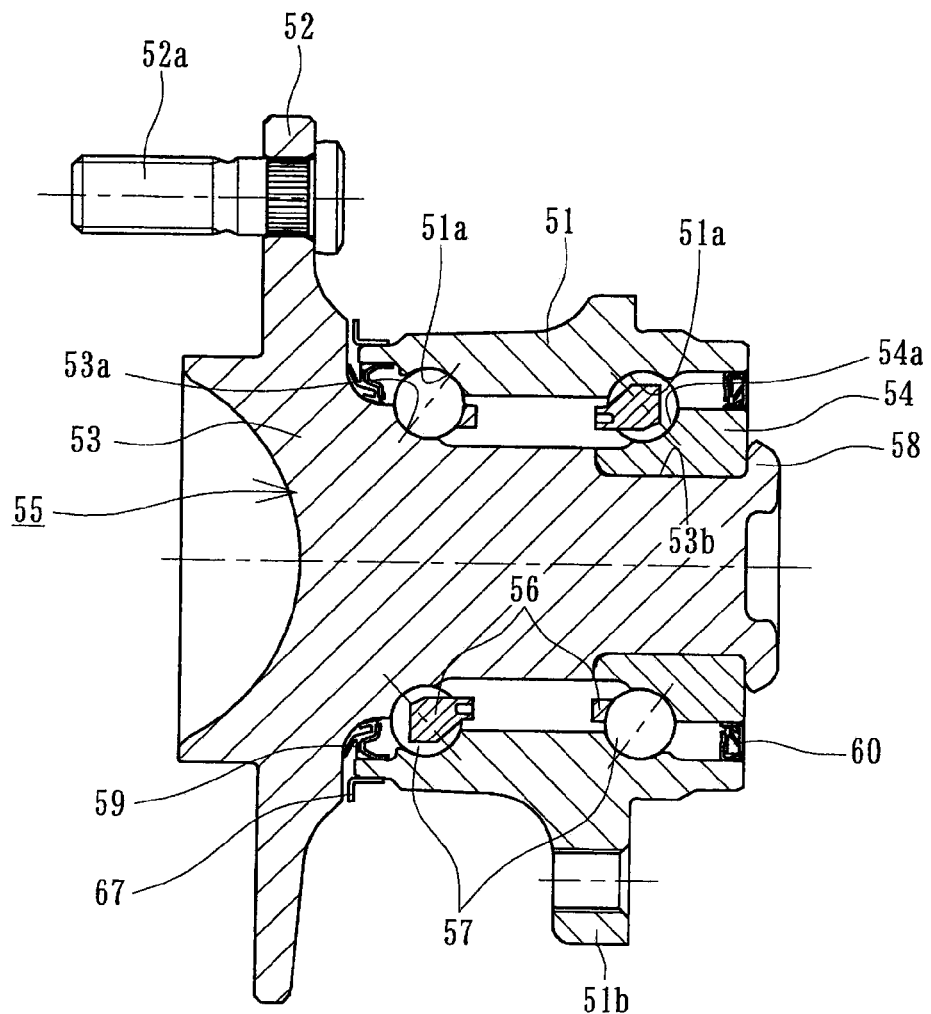

[Fig 11]
(a)
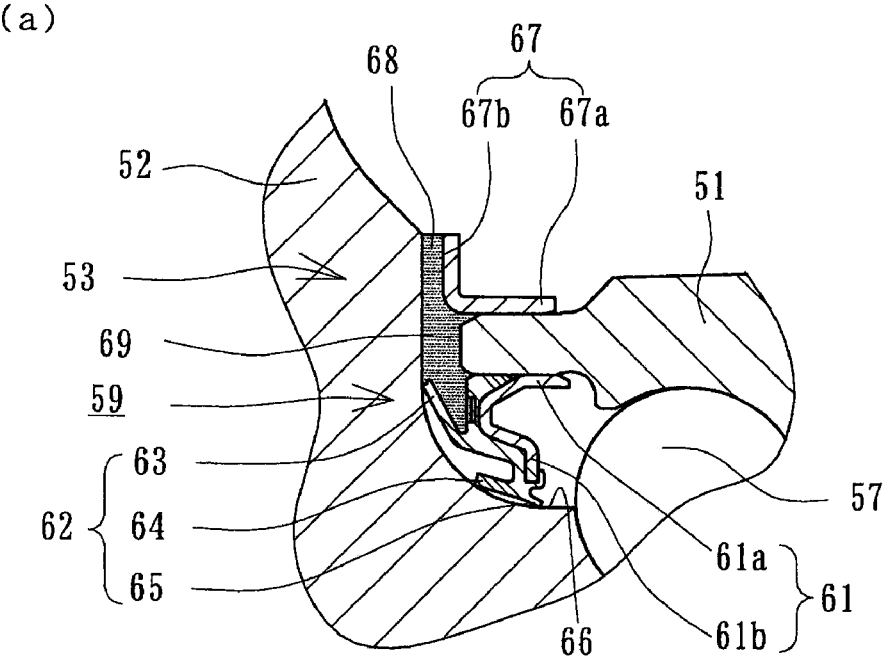
(b)
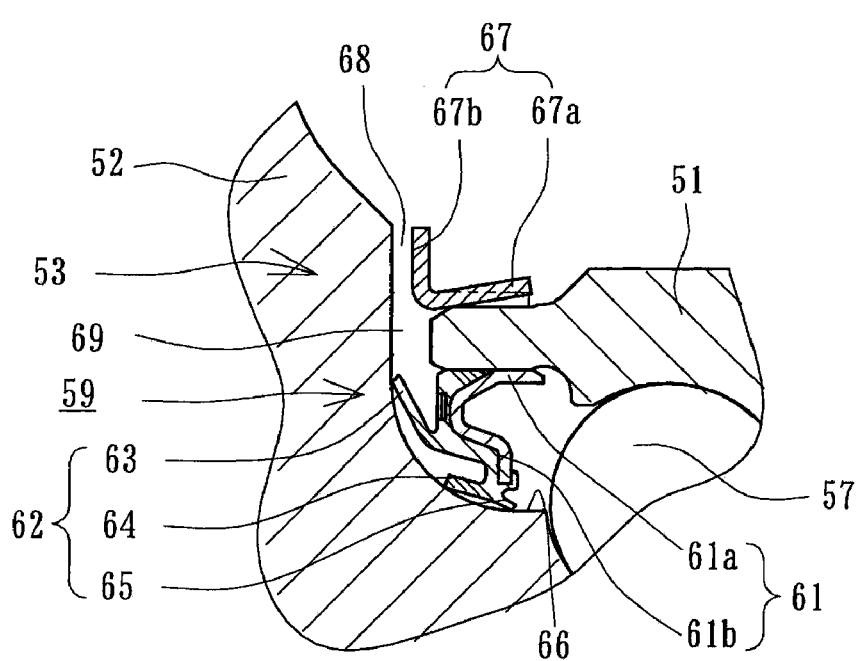

VEHICLE WHEEL BEARING APPARATUS

CROSS-REFERENCE TO RELATED APPLICATIONS

This application is a continuation of International Application No. PCT/JP2007/000392, filed Apr. 11, 2007, which claims priority to Japanese Application Nos. 2006-109992, filed Apr. 12, 2006; 2006-109993, filed Apr. 12, 2006; 2006-129914, filed May 9, 2006; and 2006-129915, filed May 9, 2006. The disclosures of the above applications are incorporated herein by reference.

FIELD

The present disclosure relates to a wheel bearing apparatus that freely rotationally supports a wheel of a vehicle, such as an automobile, relative to a suspension apparatus and, more particularly, to a wheel bearing apparatus intended to extend its life by improving the sealability and durability of its seals mounted on the wheel bearing apparatus.

BACKGROUND

The wheel bearing apparatus supports a wheel of a vehicle that freely rotationally supports a wheel hub that mounts a wheel, via a double row rolling bearing, are known for driving wheels and driven wheels. Due to structural reasons, the inner ring rotation type is used for driving wheels and both inner ring rotation type and outer ring rotation type are used for driven wheels. There are four generation types of the wheel bearing apparatus. In the first generation type, the wheel bearing includes a double row angular contact ball bearing etc. fit between a knuckle, forming a part of a suspension apparatus, and a wheel hub. In the second generation type, a body mounting flange or a wheel mounting flange is directly formed on the outer circumference of an outer member. In the third generation type, one inner raceway surface is directly formed on the outer circumference of a wheel hub. In the fourth generation type, the inner raceway surfaces are formed on the outer circumferences, respectively, of a wheel hub and an outer joint member.

Seals are mounted in the bearing portion to prevent leakage of lubricating grease sealed within the bearing and to prevent rain water or dusts from entering into the bearing from the outside. Recently, a maintenance free idea has been adopted in automobiles and thus it is desirable to further extend the operational life of the wheel bearing apparatus. Under the circumstances, it has been found, after the verification of damages from recovered bearings that the main causes of damage to the wheel bearings is due to sealing defects rather than peeling of structural elements of the bearing. Accordingly, it is believed that the operational life of the bearing can be extended by improving the sealability and durability of the seals of the bearings.

Various seals have been proposed to improve sealability. One example of a prior art wheel bearing apparatus incorporating such a seal is shown in FIG. 10. In the description below, the term "outer side" defines a side that is positioned outside of a vehicle body (left-hand side in drawings). The term "inner side" defines a side that is positioned inside of a vehicle body (right-hand side in drawings) when the bearing apparatus is mounted on the vehicle body.

The wheel bearing apparatus is a third generation type for a driven wheel. It includes an outer member 51 integrally formed with a body mounting flange 51b on its outer circumference. The flange 51b is to be mounted on a knuckle (not shown). Its inner circumference includes double row raceway surfaces 51a, 51a. An inner member 55 includes a wheel hub 53 formed with one inner raceway surface 53a on its outer circumference. The one inner raceway surface 53a is arranged opposite to one of the double row outer raceway surfaces 51a, 51a. A cylindrical portion 53b axially extends from the inner raceway surface 53a. An inner ring 54 is press fit onto the cylindrical portion 53b of the wheel hub 53. The inner ring 54 is formed with the other inner raceway surfaces 54a on its outer circumference. The other inner raceway surface 54a is arranged opposite to the other of the double row outer raceway surface 51a, 51a. Double row balls 57, 57 are freely rollably contained between the outer and inner raceway surfaces, via cages 56.

Hub bolts 52a are equidistantly arranged along the periphery of the wheel mounting flange 52. The inner ring 54 is axially secured relative to the wheel hub 53 by a caulked portion 58. The caulked portion 58 is formed by plastically deforming radially outwardly the end of the cylindrical portion 53b of the wheel hub 53. Seals 59, 60 are mounted on opposite ends of the outer member 51 to prevent leakage of lubricating grease sealed within the bearing and to prevent rain water or dusts from entering into the bearing from the outside.

As shown in an enlarged view of FIG. 11($a$), an outer side seal 59 has a metal core 61 and a sealing member 62 integrally adhered to the metal core 61, via vulcanized adhesion. The metal core 61 includes a cylindrical press fit portion 61a press fit into the outer member 51. An inner portion 61b is bent radially inward from the press fit portion 61a and has a C-shaped cross-section.

The sealing member 62 is made of an elastic member, such as synthetic rubber, and is adhered to the inner portion 61b of the metal core 61. Its radially innermost end extends around the radially inner circumferential edge of the metal core 61. The sealing member 62 has radially inner and outer side lips 63, 64. The lips 63, 64 are bent radially outward and press against a ground surface of a base of the wheel mounting flange 52. The sealing member 62 further includes a radial lip 65 positioned radially inside of the inner portion 61b of the metal core 61. The lip 65 is adapted to press against a ground round corner portion 66 of a base portion of the wheel mounting flange 52.

In addition to the outer side seal 59, a shielding plate 67, forming an outside seal, is mounted on the outer side outer circumference of the outer member 51. The shielding plate 67 includes a cylindrical portion 67a, fit on the outer member 51, and an upstanding flange portion 67b. The plate 67 has a substantially L-shaped cross-section. The flange portion 67b is arranged opposite to the base end of the wheel mounting flange 52, via a predetermined gap, to form a labyrinth seal 68.

The labyrinth seal 68 prevents rain water or dusts from entering into the bearing. Thus, it is possible to have a sufficient sealing effect if the interference of the side lips 63, 64 of the outer side seal 59 is set small to reduce the rotational torque caused by the contact of the seal 59 against the wheel hub 53 and to contribute to improve fuel consumption (see Japanese Laid-open Patent Publication No. 147298/2005).

SUMMARY

In the prior art wheel bearing apparatus, foreign matter such as muddy water 69 entered through the labyrinth seal 68 into the outer side seal 59. The muddy water remains and solidifies on the outer surface of the outer side lip 63 even though the muddy water is prevented from entering into the bearing. The solidified mud hinders the flexible deformation of the side lip 63. Thus not only is the rotational torque increased but the wear on the lip 63 is enhanced and a desirable seal cannot be obtained. In addition, the stayed muddy water causes rust on the outer member 51 and the wheel hub 53. The rust hinders relative rotation between the two. Accordingly, not only is noise or vibration caused but the peeled rusts damages the side lip 63 of the seal 59 and further detracts from its sealability.

The shielding plate 67 is press fit onto the outer member 51 via a predetermined interference (FIG. 11(a)). However since the rigidity of the end of the cylindrical portion 67a is small, it is believed that the end sometimes flares out as shown in FIG. 11(b). Thus, the securing force is reduced Various vibrations are applied to the outer member 51 during a travel of the vehicle. The outer member 51 repeats oval-deformation due to the application of external loads. Accordingly, reduction of the securing force of the shielding plate 67 causes movement of the shielding plate 67 and the sealability is reduced.

It is, therefore, an object of the present disclosure to provide a vehicle wheel bearing apparatus that can improve the sealability and durability of the seal of the bearing to extend the operating life of the wheel bearing apparatus.

To achieve the object, a vehicle wheel bearing apparatus comprises an outer member formed on its outer circumference with a body mounting flange to be mounted on a suspension of a vehicle. Its inner circumference includes double row outer raceway surfaces. An inner member includes a wheel hub formed with a wheel mounting flange on one end. Its outer circumference includes a cylindrical portion. An inner ring or an outer joint member of a constant velocity universal joint is press-fit onto the wheel hub. Its outer circumference is formed with inner raceway surfaces arranged opposite to the double row outer raceway surfaces. Double row rolling elements are freely rollably contained between the outer and inner raceway surfaces of the outer and inner members, via cages. Seals are mounted within annular openings formed between the outer and the inner members. A backup seal is fit onto the outer circumference of the outer side end of the outer member. The backup seal includes a metal core with a cylindrical fitting portion and an upstanding portion that extends radially outward from the fitting portion. A sealing member is integrally adhered to the metal core. The sealing member has a side lip formed so that it extends radially outward from the metal core and inclines toward the inner side surface of the wheel mounting flange. It slidably contacts therewith via a predetermined interference.

Wheel bearing apparatus for the second, third and fourth generation types includes double row rolling bearings and seals mounted within annular openings formed between the outer and the inner members. A backup seal is fit onto the outer circumference of the outer side end of the outer member. The backup seal includes a metal core with a cylindrical fitting portion and an upstanding portion that extends radially outward from the fitting portion. A sealing member is integrally adhered to the metal core. The sealing member has a side lip formed so that it extends radially outward from the metal core and inclines toward the inner side surface of the wheel mounting flange to slidably contact it via a predetermined interference. The outer side seal cannot be directly exposed to the external circumstances. Thus, rain water and dusts that falls on the side lip of the backup seal flows from its bank-shaped outer surface to the outer member and then flow along a trough-shaped annular space. It is finally discharged outside of the bearing apparatus. Accordingly, direct entry of rain water and dusts into the outer side seal and accumulation thereon is prevented. Thus, it is possible to provide a wheel bearing apparatus that can improve the sealability and durability of the bearing seal to extend the operating life of the wheel bearing apparatus.

One end of the fitting portion is formed with a bent portion. This increases the rigidity of the end of the cylindrical fitting portion. Thus, it prevents the flare-shaped deformation during press fitting onto the outer member and obtains a strong securing force. Accordingly, it is possible to prevent the axial movement of the backup seal. Further, this maintains the interference of the side lip even if various vibrations are applied to the outer member during a travel of the vehicle and the outer member repeats oval-deformation due to the application of external loads.

The bent portion includes a portion extending from one end of the fitting portion. The bent portion includes a folded-back portion from one end of the fitting portion. The bent portion engages an annular groove formed on the outer circumference of one end of the outer member to secure the backup seal on the outer member. This prevents axial movement of the backup seal. Accordingly, this maintains the interference of the side lip even if various vibrations are applied to the outer member during travel of the vehicle and the outer member repeats oval-deformation due to the application of external loads. The bent portion includes a caulked portion formed by plastically deforming one end of the fitting portion. The bent portion includes a portion having a substantially V-shaped.

The fitting portion is formed with axially extending slits equidistantly along the circumferential direction of the fitting portion. This makes it possible to set the interference of the press fit and thus to obtain a strong securing force if there is any dimensional variation in the fitting portion. Also, it makes it easy to elastically deform the fitting portion and to press fit the backup seal.

It is preferable that an annular metal plate is secured on the inner side surface of the wheel mounting flange. It is sandwiched between the inner side surface and the hub bolts mounted on the wheel mounting flange. The annular metal plate is made by pressing a steel plate having preservation ability. The side lip is adapted to be slidably contacted by the annular metal plate. This eliminates carrying out a separate grinding process on the inner side surface of the wheel mounting flange where the side lip slidably contacts it. Thus, it is possible to provide a wheel bearing apparatus that can maintain improved sealability and thus bearing performance for a long term.

The annular metal plate is formed with an axially extending cylindrical tongue portion on either one of the inner diameter portion or the outer diameter portion. This suppresses warp of the annular metal plate during manufacturing. Also, it prevents deformation of the annular plate when it is mounted on the wheel mounting flange by the hub bolts to obtain a good sealing surface.

The tongue portion is formed with a flange portion radially extending from the tongue portion. This further increases the rigidity of the annular metal plate. Thus, it suppresses warping during manufacturing and mounting of the annular plate to obtain a good sealing contact surface.

The annular metal plate is finished to have a predetermined surface hardness and surface roughness. This provides a good sealing surface only by mounting the annular metal plate on the wheel mounting flange and suppresses wear of the slidably contacting surface of the lip and thus maintains good sealability for a long term.

An elastic member is interposed between the annular metal plate and the wheel mounting flange. This increases the closeness between the wheel mounting flange and the annular metal plate.

The annular metal plate is formed with bolt apertures through which the hub bolts are equidistantly inserted along the periphery of the annular metal plate. A plurality of slits is formed around each bolt aperture. This makes it possible to keep the flatness of the annular metal plate during fastening of the hub bolts and thus obtains a good sealing contact surface.

The inner ring(s) is axially secured on the wheel hub with a bearing pre-load applied by a caulked portion that is formed by plastically deforming, radially outwardly, the end portion of the cylindrical portion of the wheel hub. This reduces the weight and size of the wheel bearing apparatus and maintains the initially set pre-load for a long term.

The vehicle wheel bearing apparatus of the present disclosure comprises an outer member formed with a body mounting flange on its outer circumference. Its inner circumference has double row outer raceway surface. An inner member includes a wheel hub formed with a wheel mounting flange on one end. An inner ring or an outer joint member of a constant velocity universal joint is press-fit onto the wheel hub. Its outer circumference is formed with inner raceway surfaces arranged opposite to the double row outer raceway surfaces. Double row rolling elements are freely rollably contained between the outer and inner raceway surfaces of the outer and inner members, via cages. Seals are mounted within annular openings formed between the outer and the inner members. A backup seal is fit on the outer circumference of the outer side end of the outer member. The backup seal includes a metal core with a cylindrical fitting portion and an upstanding portion extending radially outward from the fitting portion. A sealing member is integrally adhered to the metal core. The sealing member has a side lip formed so that it extends radially outward from the metal core and inclines toward the inner side surface of the wheel mounting flange so as to slidably contact it via a predetermined interference. The outer side seal cannot be directly exposed to the external circumstances. Thus, rain water and dusts fall on the side lip of the backup seal flows from its bank-shaped outer surface to the outer member and then flow along a trough-shaped annular space and is finally discharged outside of the bearing apparatus. Accordingly, direct entering of rain water and dusts into the outer side seal and accumulation thereon is prevented. Thus, it is possible to provide a wheel bearing apparatus that can improve the sealability and durability of the seal of the bearing to extend the operating life of the wheel bearing apparatus.

A vehicle wheel bearing apparatus comprises a wheel hub with a wheel mounting flange on one end. A cylindrical portion axially extends from the wheel mounting flange. A wheel bearing is press fit onto the cylindrical portion of the wheel hub. The wheel bearing comprises an outer member formed on its outer circumference with a body mounting flange to be mounted on a suspension of a vehicle. It inner circumference includes double row outer raceway surfaces. A pair of inner rings is each formed with an inner raceway surface on its outer circumference. The inner raceway surfaces are arranged opposite to each of the double row outer raceway surfaces. Double row rolling elements are freely rollably contained between the outer and inner raceway surfaces, via cages. Seals are mounted within annular openings formed between the outer and the inner members. The wheel bearing is axially secured by a caulked portion that is formed by plastically deforming, radially outwardly, the end portion of the cylindrical portion. A backup seal is fit on the outer circumference of the outer side end of the outer member. The backup seal comprises a metal core with a cylindrical fitting portion and an upstanding portion that extends radially outward from the fitting portion. A sealing member is integrally adhered to the metal core. The sealing member has a side lip formed so that it extends radially outward from the metal core and inclines toward the inner side surface of the wheel mounting flange so as to slidably contact it via a predetermined interference.

DRAWINGS

Additional advantages and features of the present disclosure will become apparent from the subsequent description and the appended claims, taken in conjunction with the accompanying drawings, wherein:

FIG. 1 is a longitudinal section view of a first embodiment of the vehicle wheel bearing apparatus.

FIG. 2 is a partially enlarged cross-section view of FIG. 1.

FIGS. 3(a) and 3(b) are partially enlarged cross-sections views each showing a modification of a backup seal.

FIG. 4(a) is a front elevation view of a modification of the annular metal plate.

FIG. 4(b) is a partially enlarged elevation view of FIG. 4(a).

FIG. 5 is a longitudinal section view of a second embodiment of the vehicle wheel bearing apparatus.

FIG. 6 is a partially enlarged cross-section view of FIG. 5.

FIG. 7(a) is a longitudinal section view of a third embodiment of the vehicle wheel bearing apparatus.

FIG. 7(b) is a plan view of a sealing member of the backup seal of FIG. 7(a).

FIG. 8 is a partially enlarged section view of a fourth embodiment of the vehicle wheel bearing apparatus.

FIG. 9 is a partially enlarged cross-section view of a fifth embodiment of the vehicle wheel bearing apparatus.

FIG. 10 is a longitudinal section view of a prior art vehicle wheel bearing apparatus FIG. 11(a) is a partially enlarged cross-section view of FIG. 10.

FIG. 11(b) is a cross-section explanatory view of a condition where a shielding plate is press fit.

DETAILED DESCRIPTION

Preferable embodiments of the present disclosure will be hereinafter described with reference to the drawings.

FIG. 1 is a longitudinal section view of a first embodiment of the vehicle wheel bearing apparatus of the present disclosure. FIG. 2 is a partially enlarged view of FIG. 1. The bearing apparatus for a wheel of a vehicle of the present disclosure shown in FIG. 1 is a second generation type for a driving wheel. It includes a wheel hub 1 and a wheel bearing 2. The wheel bearing 2 includes an outer member 3 and a pair of inner ring 5, 5 fit in the outer member 3, via double row rolling elements (tapered rollers) 4, 4.

The wheel hub 1 has on one end, a wheel mounting flange 6 to mount a wheel (not shown). A cylindrical portion 1a axially extends from the wheel mounting flange 6. The wheel hub inner circumference includes a serration (or spline) 1b. Hub bolts 6a are equidistantly mounted about the periphery on the wheel mounting flange 6. The wheel bearing 2 is press fit onto the cylindrical portion 1a, via a predetermined interference. It is axially secured relative to the wheel hub 1 by a caulked portion 1c. The caulked portion 1c is formed by radially outwardly plastically deforming the end of the cylindrical portion 1a.

The wheel hub 1 is made of medium carbon steel including carbon of 0.40~0.80% by weight such as S53C. It is hardened by high frequency induction quenching so that a region from a flange base 6b through a shoulder to the cylindrical portion 1a has a surface hardness of 58~64 HRC. Accordingly, the wheel hub 1 has a sufficient mechanical strength against the rotary bending load applied to the wheel mounting flange 6. Accordingly, the anti-fretting strength of the cylindrical portion 1a, on which inner rings 5, 5 are fitted, can be improved.

The outer member 3 of the wheel bearing 2 is integrally formed with a body mounting flange 36 on its outer circumference. The body mounting flange 3b is mounted on a knuckle (not shown). Double row outer raceway surfaces 3a, 3a, each diverging outward, are formed on the inner circumference of the outer member. The outer member 3 is made of medium carbon steel including carbon of 0.40~0.80% by weight such as S53C. The double row outer raceway surfaces 3a, 3a are hardened by high frequency induction quenching so as to have a surface hardness of 58~64 HRC.

Each inner ring 5 is formed with an inner raceway surface 5a on its outer circumference. The inner raceway surface 5a is arranged oppositely to one of the double row outer raceway surfaces 3a, 3a. A larger flange 5b guides the tapered rollers 4. A smaller flange 5c is formed at its smaller diameter side to prevent fall out of the tapered rollers 4. The inner rings 5, 5 are made of high carbon chrome steel such as SUJ2. They are hardened to their core by dip quenching to have a hardness of 58~64 HRC. A plurality of rolling elements 4, 4, are freely rollably held by cages 7, 7. The rolling elements 4, 4 are contained between the outer and inner raceway surfaces of the outer member 3 and the pair of inner rings 5, 5. The wheel bearing 2 is a so-called a back-to-back double row tapered roller bearing where the bearing 2 abuts against the shoulder 1d of the wheel hub 1. The smaller flanges 5c of two inner rings 5 abut against each other.

Seals 8, 8 are mounted within annular openings formed between the outer member 3 and inner rings 5. The seals 8, 8 prevent leakage of grease contained in the bearing and the entering of rain water and dusts into the bearing from the outside. As shown in the enlarged view of FIG. 2, each seal 8 includes a so-called pack seal with an annular sealing plate 9 and a slinger 10. Each has an L-shaped cross section and is arranged opposite to each other. The sealing plate 9 has a metal core 11 fit into the end of the outer member 3. Sealing member 12 is integrally adhered to the metal core 11, via vulcanized adhesion. The metal core 11 is made of austenitic-stainless steel sheet (JIS SUS 304 etc.) or preserved cold rolled steel sheet (JIS SPCC etc.) and is formed with a generally L-shaped cross-section by a press process.

The slinger 10 is made of austenitic-stainless steel sheet (JIS SUS 304 etc.) or preserved cold rolled steel sheet (JIS SPCC etc.). It is formed with a generally L-shaped cross-section by a press process. A cylindrical portion 10a is press fit onto the larger flange 5b of the inner ring 5. An upstanding portion 10b radially outwardly extends from the cylindrical portion 10a. A pair of side lips 12a, 12b are integrally formed with the sealing member 12. The side lips 12a, 12b are in sliding contact with the upstanding portion 10b of the slinger 10. A radial lip 12c is in sliding contact with the cylindrical portion 10a. In addition, a radially outermost edge of the upstanding portion 10b of the slinger 10, opposite to the sealing member 12, via a small radial gap, forms a labyrinth seal.

In addition to the pair of seals 8, 8, a backup seal (backup) 13 is press fit onto the outer circumference of the end of the outer member 3. The backup seal 13 includes a metal core 14 and a sealing member 15 integrally adhered to the metal core 14, via vulcanized adhesion. The metal core 14 is made of austenitic-stainless steel sheet (JIS SUS 304 etc.) or preserved cold rolled steel sheet (JIS SPCC etc.). It has a generally L-shaped cross-section by a press process.

The sealing member 15 includes a base portion 15a secured on the outer circumferential edge of the metal core 14. A side lip 15b extends radially outward from the base portion 15a. The slide lips 15b is inclined to form a flared configuration. The side lip 15b slidably contacts an annular metal plate 16 mounted on the inner side surface 6c of the wheel mounting flange 6. It prevents rain water or dusts from entering into the seal 8. Accordingly, it is possible to prevent rain water or dusts from staying in an annular space between the wheel hub 1 and the wheel bearing 2. Also, it prevents the generation of rust on the base portion 6b of the wheel mounting flange 6 and reduces its strength.

The annular metal plate 16 is made of austenitic-stainless steel sheet (JIS SUS 304 etc.) or preserved cold rolled steel sheet (JIS SPCC etc.) and is formed by a press process. It is secured on the wheel mounting flange 6 by being sandwiched between hub bolts 6a. The annular metal plate 16 is secured using a packing (not shown) to increase the closeness of the annular plate 16 relative to the inner side surface 6c of the wheel mounting flange 6.

The annular metal plate 16 has a generally disc shaped configuration. It is provided with an axially extending cylindrical tongue 16a at its inner circumference. It has a substantially L-shaped cross-section and is finished to have a predetermined surface hardness and roughness. Accordingly, it is possible to suppress warping of the annular plate 16 during the press process to prevent deformation of the annular plate 16 during mounting of the annular plate 16 and to keep the flatness and thus to obtain a good sealing contact surface. Accordingly, it is possible to omit a grinding process of the inner side surface of the wheel mounting flange to obtain a predetermined surface roughness.

Although it is illustrated as a second generation type for a driving wheel, it should be noted that the present disclosure may be applied to the third or fourth generation type and also to a driven wheel. In addition, although it is shown as a double row tapered roller bearing, the present disclosure may be applied to a double row angular contact ball bearing.

FIGS. 3(a) and 3(b) are partially enlarged cross-section views of modifications of the backup seal of the present disclosure. The same reference numerals as those used in the previous embodiment are also used in these modifications.

An annular metal plate 17 shown in FIG. 3(a) is made of austenitic-stainless steel sheet (JIS SUS 304 etc.) or preserved cold rolled steel sheet (JIS SPCC etc.) formed by a press process. It is secured on the wheel mounting flange 6 by being sandwiched between hub bolts 6a. The annular metal plate 17 has a generally disc shaped configuration. It has an axially extending cylindrical tongue 17a at its inner circumference. It has a substantially L-shaped cross-section. Accordingly, it is possible to suppress warping of the annular plate 17 during the press process. This prevents deformation of the annular plate 17 during mounting of the annular plate 17. Also, it keeps the flatness and thus obtains a good sealing contact surface.

A backup seal 19 shown in FIG. 3(b) is different in its configuration and its dimension of side lip 20b slidably contacts a flange portion 18b of an annular metal ring. The backup seal 19 includes a metal core 14 and sealing member 20 integrally adhered to the metal core 14, via vulcanized adhesion. The sealing member 20 includes a base portion 20a. A side lip 20b extends radially outward from the base portion 20a. It is inclined to form a flared configuration. The side lip 20b slidably contacts a flange portion 18b of an annular metal plate 18.

The annular metal plate 18 is made of austenitic-stainless steel sheet (JIS SUS 304 etc.) or preserved cold rolled steel sheet (JIS SPCC etc.) formed by a press process and secured on the wheel mounting flange 6 by hub bolts 6a. The annular metal plate 18 has a generally disc shaped configuration with an axially extending cylindrical tongue 18a at its inner circumference. The flange portion 18b extends radially inward from the tongue 18a. Accordingly, it is possible to suppress warping of the annular plate 18 during the press process. This prevents deformation of the annular plate 18 during mounting of the annular plate 18. Also, it keeps the flatness and thus provides a good sealing contact surface.

FIG. 4(*a*) is a front elevation view of a modification of the annular metal plate. FIG. 4(*b*) is a partially enlarged view of FIG. 4(*a*). The same reference numerals as those used in the previous embodiment are also used in this modification.

This annular metal plate 21 is made of austenitic-stainless steel sheet (JIS SUS 304 etc.) or preserved cold rolled steel sheet (JIS SPCC etc.) formed by a press process. It is secured on the wheel mounting flange 6 by being sandwiched between the hub bolts 6a. The annular metal plate 21 is secured using a packing (not shown) to increase the closeness of the annular plate 21 relative to the inner side surface 6c of the wheel mounting flange 6.

The annular metal plate 21 has a generally disc shaped configuration. An axially extending cylindrical tongue 21a is provided at its inner circumference. The plate 21 has a substantially L-shaped cross-section and is finished to have a predetermined surface hardness and roughness. The tongue 21a may be provided at the outer circumference of the annular metal plate 21. A plurality of radial slits 22a is formed around each bolt insertion aperture 22. Accordingly, it is possible to suppress warping of the annular plate 21 during the press process. It is possible to prevent deformation of the annular plate 21 during mounting of the annular plate 21. Also, it is possible to keep the flatness and thus provide a good sealing contact surface. Accordingly, it is possible to omit a grinding process of an inner side surface of the wheel mounting flange to obtain a predetermined surface roughness.

FIG. 5 is a longitudinal section view of a second embodiment of the vehicle wheel bearing apparatus. FIG. 6 is a partially enlarged view of FIG. 5. This embodiment is different from the first embodiment only in the structure of the backup seal. Thus, the same reference numerals as those used in the previous embodiment are also used in this modification.

The wheel bearing apparatus of this embodiment is also a second generation type for a driving wheel and comprises a wheel hub 1 and a wheel bearing 23. The wheel bearing 23 includes an outer member 24, having an integrally formed body mounting flange 3b. The flange 3b is to be mounted on a suspension apparatus. Double row tapered outer raceway surfaces 3a, 3a have smaller diameter sides that are adjacent each other. A pair of inner rings 5, 5 each has a tapered inner raceway surface 5a arranged opposite to one of the outer raceway surface 3a. Double row rolling elements 4, 4 are freely rollably contained between the outer and inner raceway surfaces via cages 7.

The outer member 24 is made of medium carbon steel including carbon of 0.40~0.80% by weight such as S53C. The double row outer raceway surfaces 3a, 3a are hardened by high frequency induction quenching so as to have a surface hardness of 58~64 HRC. The wheel bearing 23 is press fit onto the cylindrical portion 1b of the wheel hub 1, via a predetermined interference. It is axially secured by the caulked portion 1c. The caulked portion is formed by radially outwardly plastically deforming the end of the cylindrical portion 1b under a condition in which a pre-load is applied. This makes it possible to have a self-retaining structure where a stable pre-load can be maintained for a long term without controlling the pre-load with adjusting fastening torque of a nut etc.

A backup seal is mounted on the circumference of the outer side end of the outer member 24. It has a metal core 26 press fit onto the circumference of the end of the outer member 24. A sealing member 27 is integrally adhered to the metal core 26, via vulcanized adhesion. The sealing member 27 has a side lip 27a slidably contacting the inner side surface 6c of the wheel mounting flange 6. The metal core 26 is made of ferritic stainless steel (JIS SUS 430 etc.), austenitic-stainless steel sheet (JIS SUS 304 etc.) or preserved cold rolled steel sheet (JIS SPCC etc.). It is formed with a generally L-shaped cross-section by a press process. It has a cylindrical fitting portion 26a press fit onto the circumference of the end of the outer member 24. An upstanding portion 26b extends outward from the fitting portion 26. The sealing member 27 is integrally adhered to the upstanding portion 26b by vulcanized adhesion.

The sealing member is made of synthetic rubber such as nitrile rubber. The side lip 27a of the sealing member 27 is inclined radially outward so that it slidably contacts the ground inner side surface 6c of the wheel mounting flange 6, via a predetermined interface. Since the side lip 27a is inclined radially outward in a flared fashion, rain water or dusts on the side lip 27a flows toward the outer member 24. It is discharged from the bottom of the outer member 24 through an annular groove 28. Thus, it is possible to have high sealability to prevent the rain water or dusts from staying on the slidably contacting portion of lip and entered into the seal 8.

In addition the end of the fitting portion 26a of the metal core 26 is plastically deformed to form a caulked portion 29 toward the annular groove 28 formed on the outer circumference of the outer member 24. Thus, this firmly secures the backup seal 25 onto the outer member 24. This prevents the backup seal 25 from being axially moved even if an external force is applied to the outer member 24. Micro oval deformation of the outer member 24 would be repeatedly caused if any vibration is caused on the outer member 24. Accordingly, it is possible to stably maintain the interference of the side lip 27a. This provides a wheel bearing apparatus with improved sealability and durability of the backup seal 25 and the seal 8. Although it is illustrated that the caulked portion 29 is formed around a whole circumference of the fitting portion 26a, it may be possible to provide several caulked portions 29 along the circumference of the fitting portion 26a.

FIG. 7(*a*) is a partially enlarged view showing a third embodiment of the wheel bearing apparatus. FIG. 7(*b*) is a plan view of a backup seal of FIG. 7(*a*). This embodiment is different from the second embodiment (FIG. 6) only in the structure of the backup seal. Thus, the same reference numerals as those used in the previous embodiment are also used in this modification.

A backup seal 30 comprises a metal core 31 press fit onto the circumference of the end of the outer member 24. A sealing member 27 is integrally adhered to the metal core 31, via vulcanized adhesion. The metal core 31 is made of ferritic stainless steel (JIS SUS 430 etc.), austenitic-stainless steel sheet (JIS SUS 304 etc.) or preserved cold rolled steel sheet (JIS SPCC etc.). It is formed with a generally L-shaped cross-section by press process. A cylindrical fitting portion 31a is press fit onto the circumference of the end of the outer member 24. An upstanding portion 26b extends outwardly from the fitting portion 31a.

In this embodiment, a metal core 31 has a anchoring portion 32 formed at the end of its fitting portion 31a. It has a substantially V-shaped cross-section. The backup seal 30 can be snapped in the annular groove 28 and secured onto the outer member 24 by press fitting the fitting portion 31a while elastically deforming the fitting portion 31a and positioning the anchoring portion 32 on the annular groove 28 of the outer member 24. This mounts the backup seal 30 onto the outer member 24 by one-touch manner and prevents the backup seal 30 from being moved axially.

According to this embodiment, the fitting portion 31a is formed with axially extending slits 33. The slits are arranged equidistantly along the periphery as shown in FIG. 7(b). This sets the interference of the fitting portion 31a, to obtain a strong securing force irrespective of dimensional variation of the fitting portion. Also, it makes it easy to elastically deform the fitting portion 31a.

FIG. 8 is a partially enlarged cross-section view of a fourth embodiment of the wheel bearing apparatus. This embodiment is different from the second embodiment (FIG. 6) and the third embodiment (FIG. 7) only in the structure of the backup seal. Thus, the same reference numerals as those used in the previous embodiment are also used in this modification.

In this embodiment a backup seal 34 is mounted on an outer side bearing space on the circumference of the outer side end of the outer member 24. The backup seal 34 includes a metal core 35 press fit onto the circumference of the end of the outer member 24. The sealing member 27 is integrally adhered to the metal core 35 via vulcanized adhesion. The metal core 35 is made of ferritic stainless steel (JIS SUS 430 etc.), austenitic-stainless steel sheet (JIS SUS 304 etc.) or preserved cold rolled steel sheet (JIS SPCC etc.). It is formed with a generally L-shaped cross-section by a press process. It has a cylindrical fitting portion 35a press fit onto the circumference of the end of the outer member 24. The upstanding portion 26b extends outward from the fitting portion 35a. The sealing member 27 is integrally adhered to the upstanding portion 26b via vulcanized adhesion.

In this embodiment the end of the fitting portion 35a of the metal core 35 is formed with a radially outwardly extending bent portion 36. This increases the rigidity of the end of the cylindrical fitting portion. Thus, this prevents the flare-shaped deformation during its press fitting onto the outer member and obtains a strong securing force. Accordingly, it is possible to prevent axial movement of the backup seal. Thus, this maintains the interference of the side lip even if various vibrations are applied to the outer member during travel of the vehicle and the outer member 24 repeats oval-deformation due to application of external loads.

FIG. 9 is a partially enlarged cross-section view of a fifth embodiment of the wheel bearing apparatus. This embodiment is different from the fourth embodiment (FIG. 8) only in the structure of the backup seal. Thus, the same reference numerals as those used in the previous embodiment are also used in this modification.

The backup seal 37 includes a metal core 38 press fit onto the circumference of the end of the outer member 24. The sealing member 27 is integrally adhered to the metal core 38, via vulcanized adhesion. The metal core 38 is made of ferritic stainless steel (JIS SUS 430 etc.), austenitic-stainless steel sheet (JIS SUS 304 etc.) or preserved cold rolled steel sheet (JIS SPCC etc.). It is formed with a generally L-shaped cross-section by a press process. It has a cylindrical fitting portion 38a press fit onto the circumference of the end of the outer member 24. The upstanding portion 26b extends outwardly from the fitting portion 38a.

In this embodiment, the end of the fitting portion 38a of the metal core 38 is formed with a folded-back portion 39 that is bent radially outward. This increases the rigidity of the end of the cylindrical fitting portion. Thus, this prevents the flare-shaped deformation during its press fitting onto the outer member and obtains a strong securing force. Accordingly, it is possible to prevent axial movement of the backup seal for a long term.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

The wheel bearing apparatus of the present disclosure can be applied to any of the bearing apparatus of the second, third or fourth generation irrespective for the driving wheel or the driven wheel.

What is claimed is:

1. A vehicle wheel bearing apparatus comprising:

an outer member formed on its outer circumference with a body mounting flange to be mounted on a suspension of a vehicle, its inner circumference includes double row outer raceway surfaces;

an inner member includes a wheel hub formed with a wheel mounting flange on one end, a cylindrical portion axially extends from the wheel mounting flange, an inner ring or an outer joint member of a constant velocity universal joint is press-fit onto the wheel hub and the inner ring is formed on its outer circumference with inner raceway surfaces arranged opposite to the double row outer raceway surfaces;

double row rolling elements are freely rollably contained between the outer and inner raceway surfaces of the outer and inner members, via cages;

seals are mounted within annular openings formed between the outer and the inner members;

a backup seal is fit onto the outer circumference of the outer side end of the outer member, the backup seal comprises a metal core including a cylindrical fitting portion and an upstanding portion extending radially outward from the fitting portion, a sealing member is integrally adhered to the metal core;

the sealing member has a side lip formed to extend radially outward from the metal core and inclined toward the inner side surface of the wheel mounting flange so as to slidably contact the flange via a predetermined interference; and an annular metal plate is secured on the inner side surface of the wheel mounting flange and being sandwiched between the inner side surface and hub bolts mounted on the wheel mounting flange, the annular metal plate is made by pressing a steel plate having preservation ability, and wherein the side lip is adapted to be slidably contacted to the annular metal plate.

2. The vehicle wheel bearing apparatus of claim 1, wherein one end of the fitting portion is formed with a bent portion.

3. The vehicle wheel bearing apparatus claim 2, wherein the bent portion comprises a portion extending from one end of the fitting portion.

4. The vehicle wheel bearing apparatus of claim 1, wherein the bent portion comprises a folded-back portion from one end of the fitting portion.

5. The vehicle wheel bearing apparatus of claim 1, wherein the bent portion is engaged with an annular groove formed on the outer circumference of one end of the outer member to secure the backup seal on the outer member.

6. The vehicle wheel bearing apparatus of claim 5, wherein the bent portion comprises a caulked portion formed by plastically deforming one end of the fitting portion.

7. The vehicle wheel bearing apparatus of claim 5, wherein the bent portion comprises a portion having a substantially V-shaped.

8. The vehicle wheel bearing apparatus of claim 7, wherein the fitting portion is formed with axially extending slits equidistantly positioned along the circumferential direction of the fitting portion.

9. The vehicle wheel bearing apparatus of claim 1, wherein either one of the inner diameter portion or the outer diameter portion of the annular metal plate is formed with an axially extending cylindrical tongue portion.

10. The vehicle wheel bearing apparatus of claim 9, wherein the tongue portion is formed with a flange portion radially extending from the tongue portion.

11. The vehicle wheel bearing apparatus of claim 1, wherein the annular metal plate is finished to have a predetermined surface hardness and surface roughness.

12. The vehicle wheel bearing apparatus of claim 1, wherein an elastic member is interposed between the annular metal plate and the wheel mounting flange.

13. The vehicle wheel bearing apparatus of claim 1, wherein the annular metal plate is formed with bolt apertures through which the hub bolts are inserted equidistantly along the periphery of the annular metal plate, and wherein a plurality of slits is formed around each bolt aperture.

14. The vehicle wheel bearing apparatus of claim 1, wherein the inner ring(s) is axially secured on the wheel hub with a bearing pre-load being applied by a caulked portion formed by radially outwardly plastically deforming the end portion of the cylindrical portion of the wheel hub.

* * * * *